(12) United States Patent
Iketaka et al.

(10) Patent No.: US 9,400,016 B2
(45) Date of Patent: Jul. 26, 2016

(54) RADIAL ROLLER BEARING, ROTARY MACHINE INCLUDING RADIAL ROLLER BEARING, AND METHOD FOR DESIGNING RADIAL ROLLER BEARING

(71) Applicant: Mitsubishi Heavy Industries Automotive Thermal Systems Co., Ltd., Kiyosu-shi, Aichi (JP)

(72) Inventors: Goshi Iketaka, Tokyo (JP); Shinichi Takahashi, Tokyo (JP); Takayuki Hagita, Tokyo (JP); Akinori Yoshioka, Tokyo (JP); Takeshi Hirano, Tokyo (JP)

(73) Assignee: MITSUBISHI HEAVY INDUSTRIES AUTOMOTIVE THERMAL..., Kiyosu-shi (JP)

( * ) Notice: Subject to any disclaimer, the term of this patent is extended or adjusted under 35 U.S.C. 154(b) by 0 days.

(21) Appl. No.: 14/354,087

(22) PCT Filed: Oct. 23, 2012

(86) PCT No.: PCT/JP2012/077339
§ 371 (c)(1),
(2) Date: Apr. 24, 2014

(87) PCT Pub. No.: WO2013/065526
PCT Pub. Date: May 10, 2013

(65) Prior Publication Data
US 2014/0270613 A1    Sep. 18, 2014

(30) Foreign Application Priority Data
Oct. 31, 2011   (JP) .................................. 2011-239056

(51) Int. Cl.
*F16C 33/66* (2006.01)
*F16C 33/34* (2006.01)
(Continued)

(52) U.S. Cl.
CPC ........... *F16C 41/004* (2013.01); *F04B 39/0094* (2013.01); *F16C 19/466* (2013.01);
(Continued)

(58) Field of Classification Search
CPC ........ F16C 19/24; F16C 19/466; F16C 33/36; F16C 33/585; F16C 33/66; F16C 33/6637; F16C 33/664; F04C 2230/92
USPC ......... 384/456, 462, 548, 561, 565, 568, 593, 384/597, 618, 467; 29/898.1, 898.04, 29/898.068
See application file for complete search history.

(56) References Cited

U.S. PATENT DOCUMENTS 4,886,479 A * 12/1989 Richtmeyer et al. .......... 464/111
6,062,736 A *  5/2000 Zernickel ...................... 384/581
(Continued)

FOREIGN PATENT DOCUMENTS

CN     1417496 A      5/2003
JP     71042208 B  * 12/1971
(Continued)

OTHER PUBLICATIONS

Pumps & Systems Miles Woodard Feb. 2014.*
(Continued)

*Primary Examiner* — Marcus Charles
(74) *Attorney, Agent, or Firm* — Westerman, Hattori, Daniels & Adrian, LLP

(57) ABSTRACT

The properties of lubricating oil are utilized to avoid excessive quality in terms of the circularity of roller members while reducing the noise from a radial roller bearing alone during rotation and thereby reducing the noise from a rotary machine. The radial roller bearing includes an outer ring member (30A), a plurality of roller members (30B), and a retainer, and a lubricating oil (O) is supplied between the outer ring member (30A) or a rotating shaft and the roller members (30B). The circularity ($\Delta R$) of the roller members (30B) in a cross section perpendicular to a centerline (CL) thereof is set to be lower than or equal to the minimum oil film thickness ($h_{min}$) of an oil film formed by the lubricating oil (O).

11 Claims, 4 Drawing Sheets

(51) Int. Cl.
*F16C 41/00* (2006.01)
*F16C 19/46* (2006.01)
*F04B 39/00* (2006.01)
F04C 29/00 (2006.01)
F04C 29/02 (2006.01)
F04C 18/02 (2006.01)

(52) U.S. Cl.
CPC .......... *F16C 33/34* (2013.01); *F16C 33/6637* (2013.01); *F04C 18/0215* (2013.01); *F04C 29/0057* (2013.01); *F04C 29/02* (2013.01); *F04C 2230/92* (2013.01); *F04C 2240/50* (2013.01); *F04C 2240/56* (2013.01); *F04C 2270/13* (2013.01); *F16C 2240/56* (2013.01); *F16C 2360/00* (2013.01)

(56) References Cited

U.S. PATENT DOCUMENTS

| | | | |
|---|---|---|---|
| 6,500,088 B2 * | 12/2002 | Sugihara | 476/8 |
| 6,524,009 B1 * | 2/2003 | Kurimura et al. | 384/491 |
| 6,764,219 B2 * | 7/2004 | Doll et al. | 384/565 |
| 6,997,616 B2 * | 2/2006 | Sakoda et al. | 384/450 |
| 7,008,115 B2 * | 3/2006 | Nakata et al. | 384/463 |
| 7,806,598 B2 * | 10/2010 | Doll et al. | 384/569 |
| 7,896,557 B2 * | 3/2011 | Nakano et al. | 29/898.062 |
| 8,118,493 B2 * | 2/2012 | Tsujimoto | 384/571 |
| 2007/0065061 A1 | 3/2007 | Terada et al. | |
| 2008/0245443 A1 * | 10/2008 | Devlin et al. | 148/240 |

FOREIGN PATENT DOCUMENTS

| | | | | | |
|---|---|---|---|---|---|
| JP | 11182557 | A | * | 7/1999 | F16C 33/46 |
| JP | 2000130454 | A | * | 5/2000 | F16C 35/077 |
| JP | 2000-179559 | A | | 6/2000 | |
| JP | 2001-264193 | A | | 9/2001 | |
| JP | 2003-074565 | A | | 3/2003 | |
| JP | 2004225551 | A | * | 8/2004 | F01L 1/18 |
| JP | 2005-308138 | A | | 11/2005 | |
| JP | 2006214931 | A | * | 8/2006 | G01N 29/04 |
| JP | 2008088995 | A | * | 4/2008 | F16C 33/64 |
| JP | 2009-293523 | A | | 12/2009 | |
| JP | 2011-208751 | A | | 10/2011 | |

OTHER PUBLICATIONS

Film Thickness Calculation Lubrecht et al. Aug. 2008.*
International Search Report, dated Nov. 27, 2012, issued in corresponding application No. PCT/JP2012/077339.
Written Opinion, dated Nov. 27, 2012, issued in corresponding application No. PCT/JP2012/077339.
Office Action dated Sep. 6, 2015, issued in counterpart Chinese Patent Application No. 201280052859.6 w/English translation (16 pages).

* cited by examiner

RADIAL ROLLER BEARING, ROTARY MACHINE INCLUDING RADIAL ROLLER BEARING, AND METHOD FOR DESIGNING RADIAL ROLLER BEARING

TECHNICAL FIELD

The present invention relates to methods for designing radial roller bearings suitable for use with rotary machines, such as electric compressors, that rotate at high speed and that require quietness during operation, to such radial roller bearings, and to rotary machines including such radial roller bearings.

BACKGROUND ART

Radial roller bearings are bearings that support mainly a load applied to a rotating shaft in the radial direction (diameter direction) and include an outer ring member and a plurality of roller members (rollers) that roll on the inner surface thereof. Such radial roller bearings often further include a cage-shaped retainer (retainer) that keeps the individual roller members equally spaced. Among others, radial roller bearings including roller members having an L/D of far more than 1, where D is the diameter of the roller members and L is the length of the roller members, and an outer diameter of the roller members far smaller than the diameter of the shaft to be supported are called radial needle bearings. Examples of known rotary machines equipped with such radial needle bearings include compressors for compressing a refrigerant in a car air conditioner (see, for example, PTL 1).

Rotary machines that constitute comfort equipment, such as compressors as described above, are required to generate a minimum level of noise during operation. In the related art, PTL 2 discloses a technique in which each roller member of a thrust needle bearing, which supports a load on a rotating shaft in the thrust direction, is tapered from the rolling surface toward at least one end surface thereof to form a crown portion such that the circularity of the rolling surface in a cross section taken in the diameter direction is a predetermined level or less and that the rolling surface includes a straight portion parallel to the axis of the roller member in a cross section taken in the axial direction, thus stabilizing the rolling motion of the roller members and thereby reducing the noise therefrom.

CITATION LIST

Patent Literature

{PTL 1}
Japanese Unexamined Patent Application, Publication No. 2009-293523
{PTL 2}
Japanese Unexamined Patent Application, Publication No. 2005-308138

SUMMARY OF INVENTION

Technical Problem

In general, during the operation of either a radial roller bearing or a thrust roller bearing, lubricating oil is supplied to form an oil film between the rotating shaft and the roller members and between the roller members and the outer ring member (or a raceway ring member). For example, in car air conditioners and general air conditioner systems, the refrigerant compressed by the compressor is mixed with a dedicated lubricating oil in a predetermined proportion to lubricate components, such as bearings and a compression mechanism, as the refrigerant passes through the compressor. Generally, more lubricating oil is supplied as the rotating shaft rotates at a higher speed. The oil film formed by supplying the lubricating oil has proven to compensate for the non-circularity of the roller members in a cross section perpendicular to the centerline thereof to a certain degree.

The bearing disclosed in PTL 2, however, does not take into account the above relationship between the roller members and the lubricating oil, which results in an unnecessarily high circularity of the roller members in a cross section perpendicular to the centerline thereof and thus contributes to the high price of bearings and rotary machines such as compressors.

In view of the foregoing circumstances, an object of the present invention is to provide a radial roller bearing, a rotary machine including a radial roller bearing, and a method for designing a radial roller bearing that allow the properties of a lubricating oil to be utilized to avoid excessive quality in terms of the circularity of the roller members while reducing the noise from the radial roller bearing alone during rotation and thereby reducing the noise from a rotary machine.

Solution to Problem

To achieve the foregoing object, the present invention provides the following solutions.

Specifically, a radial roller bearing according to a first aspect of the present invention includes an outer ring member, a plurality of roller members that roll on an inner surface of the outer ring member, and a retainer, and a lubricating oil is supplied between the outer ring member or a rotating shaft and the roller members. The circularity of the roller members in a cross section perpendicular to a centerline thereof is set to be lower than or equal to the minimum oil film thickness of an oil film formed by the lubricating oil.

The inventors of the present invention have found that the oil film of the lubricating oil supplied to a radial roller bearing compensates for the non-circularity of the roller members and thus allows the circularity of the roller members to be degraded to a certain degree without causing a disadvantage in terms of noise. The inventors have also revealed by experimentation that, if the circularity of the roller members in a cross section perpendicular to the centerline thereof is set to be lower than or equal to the minimum oil film thickness of the lubricating oil, as in the radial roller bearing according to the first aspect, the precision of the circularity of the roller members can be decreased to the minimum required level. With this radial roller bearing, it is possible to avoid excessive quality in terms of the circularity of the roller members while reducing the noise from the radial roller bearing alone during rotation and thereby reducing the noise from a rotary machine.

In the first aspect, the minimum oil film thickness $h_{min}$ may be calculated from the following equation:

$$h_{min} = R * 2.65 G^{0.54} * U^{0.7} * W^{-0.13}$$

wherein R is the relative radius of curvature, G is a material parameter of the lubricating oil, U is a speed parameter of the roller members, and W is a load parameter of the roller members.

The above radial roller bearing allows the minimum oil film thickness corresponding to the shape and use conditions of the radial roller bearing to be accurately calculated. This ensures that the circularity of the roller members in a cross section perpendicular to the centerline thereof falls within the minimum oil film thickness to avoid excessive quality in terms of the circularity of the roller members in a cross section perpendicular to the centerline thereof while reliably avoiding a high level of noise from the radial roller bearing.

In the above case, the speed parameter U may be calculated from a lower limit of a normal-use rotational speed range of a rotary machine with which the radial roller bearing is used.

As described above, more lubricating oil is supplied to the radial roller bearing as the rotating shaft rotates at a higher speed. Hence, the oil film of the lubricating oil has the minimum thickness when the rotating shaft rotates at the lowest speed within the normal-use rotational speed range. Thus, if the speed parameter U is calculated from the lower limit of the normal-use rotational speed range to determine the minimum oil film thickness, and the circularity of the roller members in a cross section perpendicular to the centerline thereof is set to be lower than or equal to the minimum oil film thickness, the precision of the circularity of the roller members in a cross section perpendicular to the centerline thereof can be decreased to the minimum required level while reducing the noise from the radial roller bearing alone during rotation over the entire operating rotational speed range of the rotary machine.

In the first aspect, each of the roller members may have an outer surface whose generatrix in an axial direction is curved such that the outer diameter of the roller member decreases slightly in a direction from the center toward an end thereof in the axial direction to avoid stress concentration in a contact area between a portion of the outer surface of the roller member near the end thereof and the inner surface of the outer ring member or an outer surface of the rotating shaft, and the circularity of the roller members in a cross section perpendicular to the centerline thereof may deteriorate in the direction from the center toward the end thereof in the axial direction.

In general, each of the roller members in a radial roller bearing has an outer surface whose generatrix in the axial direction is curved such that the outer diameter of the roller member decreases slightly in the direction from the center toward the ends thereof in the axial direction mainly to avoid stress concentration in the contact areas between the portions of the outer surface of the roller member near the ends thereof and the raceway of the roller member (the inner surface of the outer ring member or the outer surface of the rotating shaft). Such roller members in the radial roller bearing are slightly more tilted as the rotating shaft rotates at a higher speed, and accordingly, the likelihood of contact in the outer surfaces of the roller members is higher near the ends thereof in the axial direction than near the center thereof in the axial direction.

As described above, more lubricating oil is supplied to form a thicker oil film as the rotating shaft rotates at a higher speed; therefore, even if the circularity of the roller members is low near the ends thereof in the axial direction, the thick oil film compensates for the low circularity so that less noise occurs. Thus, the noise level does not increase even if the circularity of the roller members in a cross section perpendicular to the centerline thereof deteriorates in the direction from the center toward the ends of the roller members in the axial direction, which avoids excessive quality in terms of the circularity of the roller members in a cross section perpendicular to the centerline thereof while reducing the noise from the radial roller bearing.

In the first aspect, the circularity may be set to 0.8 μm or less if the radial roller bearing is used in an electric compressor for a car air conditioner such that the rotational speed of the roller members is 12,000 to 43,000 rpm.

The thickness of the oil film of the lubricating oil on a radial roller bearing used in an electric compressor for a car air conditioner generally does not fall below 0.8 μm in the above rotational speed range (12,000 to 43,000 rpm); therefore, as in the above case, if the circularity of the roller members in a cross section perpendicular to the centerline thereof is set to 0.8 μm or less, the value of the circularity of the roller members in a cross section perpendicular to the centerline thereof does not exceed the oil film thickness over the entire normal-use rotational speed range of the electric compressor. This avoids a high level of noise from the radial roller bearing.

A rotary machine according to a second aspect of the present invention includes the radial roller bearing according to the first aspect as a bearing part.

The above rotary machine allows the properties of the lubricating oil to be utilized to avoid excessive quality in terms of the circularity of the roller members in a cross section perpendicular to the centerline thereof while reducing the noise from the radial roller bearing alone during rotation and thereby reducing the noise from the rotary machine.

A method for designing a radial roller bearing according to a third aspect of the present invention is a method for designing a radial roller bearing provided with an outer ring member, a plurality of roller members that roll on an inner surface of the outer ring member, and a retainer, and a lubricating oil is supplied between the outer ring member and the roller members. This method includes setting the circularity of the roller members in a cross section perpendicular to a centerline thereof to be lower than or equal to the minimum oil film thickness of an oil film formed by the lubricating oil.

The above design method allows the properties of the lubricating oil to be utilized to avoid excessive quality in terms of the circularity of the roller members while reducing the noise from the radial roller bearing alone during rotation and thereby reducing the noise from a rotary machine.

In the third aspect, the minimum oil film thickness $h_{min}$ may be calculated from the following equation:

$$h_{min} = R * 2.65 G^{0.54} * U^{0.7} * W^{-0.13}$$

wherein R is the relative radius of curvature, G is a material parameter of the lubricating oil, U is a speed parameter of the roller members, and W is a load parameter of the roller members.

The above design method allows the minimum oil film thickness corresponding to the shape and use conditions of the radial roller bearing to be accurately calculated. This ensures that the circularity of the roller members in a cross section perpendicular to the centerline thereof falls within the minimum oil film thickness to avoid excessive quality in terms of the circularity of the roller members in a cross section perpendicular to the centerline thereof while reliably avoiding a high level of noise from the radial roller bearing.

In the above case, the speed parameter U may be calculated from a lower limit of a normal-use rotational speed range of a rotary machine with which the radial roller bearing is used.

In the above design method, the speed parameter U is calculated based on the lowest rotational speed within the normal-use rotational speed range, at which the oil film of the lubricating oil has the minimum thickness. Thus, the precision of the circularity of the roller members in a cross section perpendicular to the centerline thereof can be decreased to the minimum required level while reducing the noise from the radial roller bearing alone during rotation over the entire operating rotational speed range of the rotary machine.

In the third aspect, each of the roller members may have an outer surface whose generatrix in an axial direction is curved such that the outer diameter of the roller member decreases slightly in a direction from the center toward an end thereof in the axial direction to avoid stress concentration in a contact area between a portion of the outer surface of the roller member near the end thereof and the inner surface of the outer ring member or an outer surface of a rotating shaft, and the circularity of the roller members in a cross section perpendicular to the centerline thereof may deteriorate in the direction from the center toward the end thereof in the axial direction.

The roller members in the radial roller bearing designed by the above design method are slightly more tilted as the rotating shaft rotates at a higher speed, and accordingly, the likelihood of contact in the outer surfaces of the roller members is higher near the ends thereof in the axial direction than near the center thereof in the axial direction; at the same time, more lubricating oil is supplied to form a thicker oil film. Therefore, even if the circularity of the roller members is low near the ends thereof in the axial direction, the thick oil film compensates for the low circularity so that less noise occurs. Thus, the noise level does not increase even if the circularity of the roller members in a cross section perpendicular to the centerline thereof deteriorates in the direction from the center toward the ends of the roller members in the axial direction, which avoids excessive quality in terms of the circularity of the roller members in a cross section perpendicular to the centerline thereof while reducing the noise from the radial roller bearing.

In the third aspect, the circularity may be set to 0.8 μm or less if the radial roller bearing is used in an electric compressor for a car air conditioner such that the rotational speed of the roller members is 12,000 to 43,000 rpm.

The thickness of the oil film of the lubricating oil on a radial roller bearing mounted in an electric compressor for a car air conditioner generally does not fall below 0.8 μm in the above rotational speed range (12,000 to 43,000 rpm); therefore, as in the above design method, if the circularity of the roller members in a cross section perpendicular to the centerline thereof is set to 0.8 μm or less, the value of the circularity of the roller members in a cross section perpendicular to the centerline thereof does not exceed the oil film thickness over the entire normal-use rotational speed range of the electric compressor. This avoids a high level of noise from the radial roller bearing.

Advantageous Effects of Invention

As described above, the radial roller bearing, the rotary machine including the radial roller bearing, and the method for designing a radial roller bearing according to the present invention, in which the circularity of the roller members in a cross section perpendicular to the centerline thereof is set to be lower than or equal to the minimum oil film thickness of the oil film formed by the lubricating oil, allow the properties of the lubricating oil to be utilized to avoid excessive quality in terms of the circularity of the roller members in a cross section perpendicular to the centerline thereof while reducing the noise from the radial roller bearing alone during rotation and thereby reducing the noise from a rotary machine.

DESCRIPTION OF EMBODIMENTS

An embodiment of the present invention will be described below with reference to FIGS. 1 to 5B.

Figure 1:
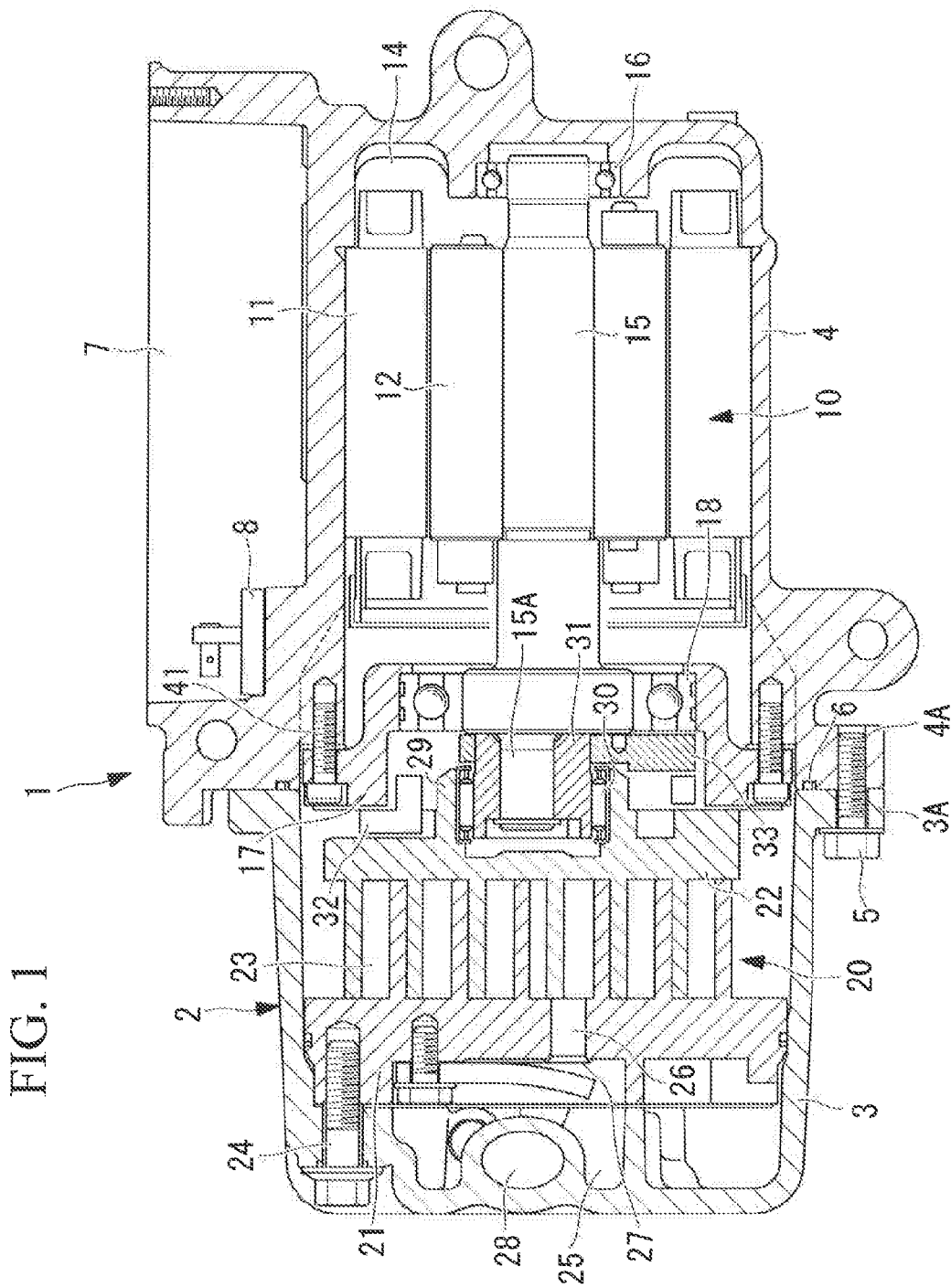
FIG. 1 is a longitudinal sectional view of an electric compressor equipped with a radial needle bearing according to an embodiment of the present invention.

FIG. 1 is a longitudinal sectional view of an electric compressor equipped with a radial needle bearing (radial roller bearing) according to an embodiment of the present invention. An electric compressor 1 is a compressor for compressing a refrigerant in a car air conditioner and includes a cylindrical housing 2 that constitutes the outer shell thereof. The housing 2 is composed of a compressor housing 3 and a motor housing 4 made of bowl-shaped aluminum die castings, and their flanges 3A and 4A are joined together using bolts 5, with an O-ring 6 therebetween.

An inverter-accommodating portion 7 is integrally provided on the outer top surface of the motor housing 4 and accommodates an inverter unit (not shown) that converts direct-current power supplied from a high-voltage power supply into three-phase alternating-current power and that supplies it to an electric motor 10 disposed in the motor housing 4 through glass-sealed terminals 8. The inverter unit may be a known inverter unit, a detailed description of which is omitted herein.

The electric motor 10 disposed in the motor housing 4 is composed of a stator 11 and a rotor 12, and the stator 11 is secured to the inner surface of the motor housing 4, for example, by press fitting. Axially extending refrigerant channels (not shown) are provided between the stator 11 and the motor housing 4 at a plurality of positions in the circumferential direction and are configured such that a refrigerant taken into a space 14 between the bottom surface of the motor housing 4 and an end surface of the electric motor 10 through a refrigerant intake port (not shown) provided at the rear end (the right end in FIGS. 3A to 3C) of the motor housing 4 can be supplied through the refrigerant channels to the front (to the left in FIG. 1) in the axial direction. The refrigerant is mixed with a lubricating oil in a predetermined proportion to lubricate, for example, a rear bearing 16, a main bearing 18, a scroll compression mechanism 20, and a radial needle bearing 30 according to the present invention, described later.

A rotating shaft (crank shaft) 15 is integrally coupled to the rotor 12; the rear end thereof is rotatably supported by the rear bearing 16, which is disposed on the bottom of the motor housing 4, and the front end thereof is rotatably supported by the main bearing 18, which is disposed on a bearing support member 17. A crank pin 15A is disposed at the front end of the rotating shaft 15 at a position offset from the axial center of the rotating shaft 15 by a predetermined length. The bearing support member 17 is secured to and supported by the motor housing 4 with bolts 41.

The scroll compression mechanism 20, on the other hand, is disposed in the compressor housing 3. The scroll compression mechanism 20 is a known compression mechanism composed of a fixed scroll 21 and an orbiting scroll 22, together forming a pair, that mesh with each other and is configured to compress a refrigerant gas as the orbiting movement of the orbiting scroll 22 moves a compression chamber 23 formed between the two scrolls 21 and 22 from the periphery toward the center thereof while reducing the volume of the compression chamber 23.

The fixed scroll 21 is secured to the bottom of the compressor housing 3 with bolts 24 and forms a discharge chamber 25 between the back surface of the end plate thereof and the bottom surface of the compressor housing 3. The orbiting scroll 22, on the other hand, has the back surface of the end plate thereof slidably supported by a thrust surface of the bearing support member 17, and the crank pin 15A of the rotating shaft 15 is rotatably inserted in a boss 29 provided on the back surface of the end plate, with the radial needle bearing 30 and a drive bush 31 therebetween.

As the electric motor 10 operates to rotate the rotating shaft 15, the crank pin 15A rotates eccentrically, and the orbiting scroll 22 orbits relative to the fixed scroll 21 to charge the refrigerant taken in through the refrigerant intake port (not shown) into the compression chamber 23 between the fixed scroll 21 and the orbiting scroll 22, where the refrigerant gas is compressed to high temperature and high pressure and is discharged outside through a discharge hole 26, a discharge valve 27, the discharge chamber 25, and a discharge port 28. The orbiting scroll 22 is prevented from rotating about the axis thereof by an Oldham ring 32 held between the back surface of the end plate and the bearing support member 17. The drive bush 31 is integrally provided with a balance weight 33 for balancing an unbalanced load due to the orbiting movement of the orbiting scroll 22.

The radial needle bearing 30, which supports the orbiting scroll 22 as it rotates eccentrically at high speed, tends to generate noise due to its own load characteristics. The noise generated therefrom is quite unpleasant, particularly in cars with a high level of quietness, such as electric cars and hybrid cars, which makes it a challenge to reduce noise.

Figure 2:
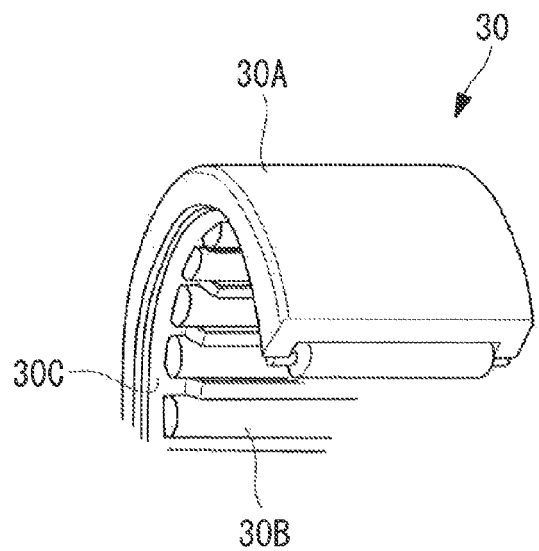
FIG. 2 is a partially cutaway perspective view of the radial needle bearing according to the embodiment of the present invention.
Figure 3A:
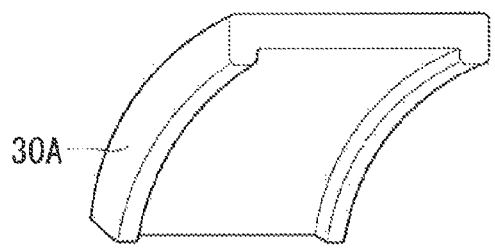
FIG. 3A is an exploded view of the radial needle bearing according to the embodiment of the present invention, showing a partial perspective view of an outer ring member.
Figure 3B:
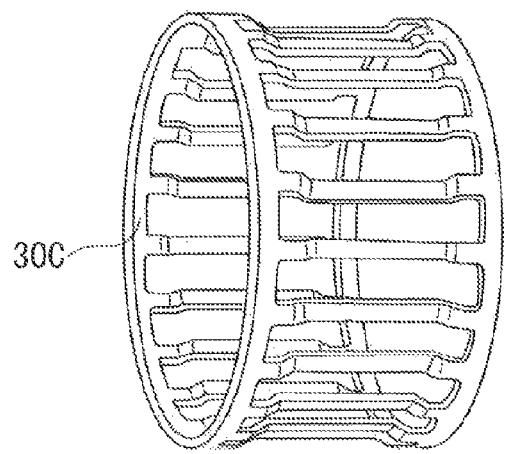
FIG. 3B is an exploded view of the radial needle bearing according to the embodiment of the present invention, showing a perspective view of a retainer.
Figure 3C:
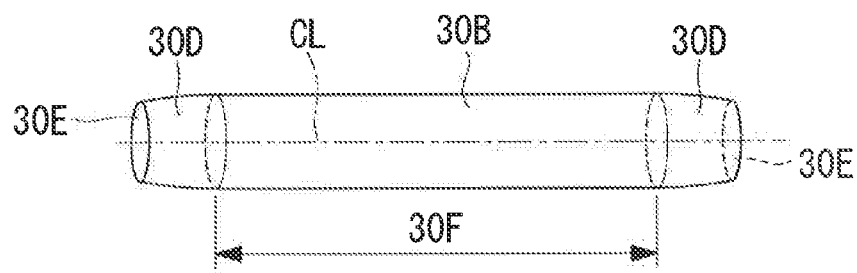
FIG. 3C is an exploded view of the radial needle bearing according to the embodiment of the present invention, showing a plan view of a roller member.
Figure 4:
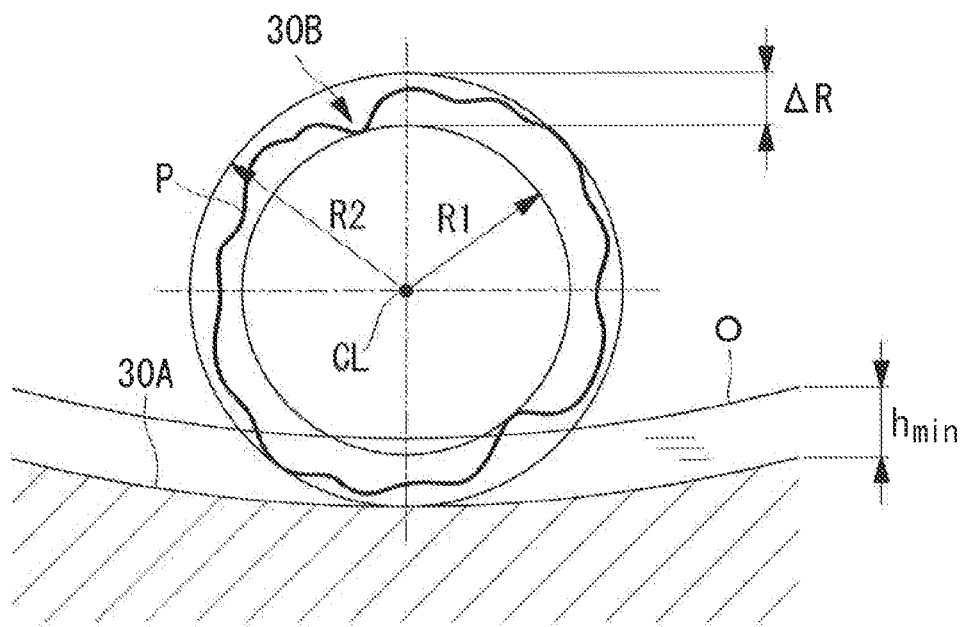
FIG. 4 is a longitudinal sectional view showing the relationship between the circularity of roller members in a cross section perpendicular to the centerline thereof and the oil film thickness in the embodiment of the present invention.

FIG. 2 is a partially cutaway perspective view of the radial needle bearing 30, and FIGS. 3A to 3C are exploded views of the radial needle bearing 30. The radial needle bearing 30 is composed of an outer ring member 30A formed in a cylindrical shape, a plurality of thin cylindrical (or roller-shaped or needle-shaped) roller members 30B that are disposed inside the outer ring member 30A and that roll on the inner surface of the outer ring member 30A, and a retainer 30C that retains the roller members 30B at a predetermined pitch. The radial clearance in this embodiment is set to, for example, 10 to 30 μm.

As described above, the lubricating oil contained in the refrigerant is supplied between the outer ring member 30A and the roller members 30B and between the roller members 30B and the outer surface of the drive bush 31 to lubricate the individual members 30A, 30B, and 31. The outer ring member 30A may be cut from a metal block or may be formed by elastically deforming a sheet metal material. The retainer 30C may have a known structure; a detailed description thereof and the outer ring member 30A are omitted herein.

As shown in FIG. 3C, each roller member 30B includes curved portions 30D formed at both ends thereof in the axial direction and having an outer diameter that decreases slightly in the direction from the center toward the ends thereof in the axial direction. The curved portions 30D occupy, for example, 10% to 20% of the overall length of the roller member 30B from both end surfaces 30E of the roller member 30B, and a rolling surface 30F with a constant outer diameter is provided between the curved portions 30D. The curved portions 30D are curved such that the generatrix of the outer surface of the roller member 30B in the axial direction is tapered, for example, in a barrel shape, from the ends of the rolling surface 30F toward the end surfaces 30E. That is, the outer surfaces of the curved portions 30D are substantially spherical (three-dimensionally curved). The curved portions 30D are intended to avoid stress concentration in the contact areas between the portions of the outer surface of the roller member 30B near the ends thereof and the inner surface of the outer ring member 30A or the outer surface of the rotating shaft 15.

The circularity of the roller members 30B is designed to be lower than or equal to the minimum oil film thickness of the oil film formed by the lubricating oil. Specifically, as shown in 4, the profile P of the roller members 30B is not a perfect circle in a strict sense, but has irregularities (the height of the irregularities is exaggerated in FIG. 4), as viewed in a cross section perpendicular to the centerline CL of the roller members 30B. The circularity ΔR (unit: μm) of the roller members 30B in a cross section perpendicular to the centerline CL thereof is defined as the difference between the radius R1 of the largest circle inscribed in the profile P and the radius R2 of the smallest circle concentric therewith that circumscribes the profile P. The circularity of the roller members 30B is designed such that the circularity ΔR is lower than or equal to the minimum oil film thickness $h_{min}$ of a lubricating oil O supplied between the outer ring member 30A and the roller members 30B (i.e., designed such that $\Delta R \leq h_{min}$). In the following description, the "circularity" of the roller members 30B in all instances refers to the circularity (ΔR) of the roller members 30B in a cross section perpendicular to the centerline CL thereof.

The minimum oil film thickness $h_{min}$ is calculated from equation (1) (Dowson-Higginson equation) below:

$$h_{min} = R * 2.65 G^{0.54} * U^{0.7} * W^{-0.13} \tag{1}$$

In equation (1), R is the relative radius of curvature. G is the material parameter of the lubricating oil defined as G=αE'. U is the speed parameter of the roller members 30B defined as U=η₀u/E'R. W is the load parameter of the roller members 30B defined as W=w/E'R. E' above is the reduced elastic modulus and is represented by equation (2) below:

$$1/E' = 0.5\{(1-v^2_1)/E_1 + (1-v^2_2)/E_2\} \tag{2}$$

where E is the longitudinal elastic modulus, and v is Poisson's ratio.

The speed parameter U is calculated from the lower limit of the normal-use rotational speed range of the electric compressor 1. Specifically, if the rotational speed of the rotating shaft 15 of the electric compressor 1 is, for example, 2,400 to 8,400 rpm, the rotational speed of the roller members 30B is 12,000 to 43,000 rpm, and the speed parameter U is calculated from the rotational speed of the roller members 30B when the rotational speed of the rotating shaft 15 is 2,400 rpm, i.e., 12,000 rpm. In general, the minimum oil film thickness is about 0.8 µm when the rotational speed of the roller members 30B is around 12,000 rpm.

More specifically, in a general electric compressor 1, as described above, the rotational speed of the roller members 30B is about 12,000 to 43,000 rpm; in this rotational speed range, the circularity of the roller members 30B is preferably set to 0.8 µm or less.

Additionally, the precision of the circularity may decrease from the bases toward the ends of the curved portions 30D. For example, if the circularity of the center of the roller members 30B in the axial direction in a cross section perpendicular to the centerline CL thereof is 0.6 µm, the circularity of the curved portions 30D at the ends thereof is set to about 0.8 to 1.2 µm.

As described above, because the circularity ΔR of the roller members 30B in a cross section perpendicular to the centerline CL thereof is set to be lower than or equal to the minimum oil film thickness $h_{min}$ of the oil film formed by the lubricating oil O, the oil film of the lubricating oil O compensates for the non-circularity of the roller members 30B. This allows the precision of the circularity ΔR of the roller members 30B to be decreased to a certain degree without causing a disadvantage in terms of noise. Thus, the precision of the circularity of the roller members 30B can be decreased to the minimum required level to avoid excessive quality in terms of the circularity of the roller members 30B while reducing the noise from the radial needle bearing 30 alone during rotation and thereby reducing the noise from the electric compressor 1.

In addition, because the minimum oil film thickness $h_{min}$ is calculated from equation (1), i.e., the Dowson-Higginson equation, the minimum oil film thickness $h_{min}$ corresponding to the shape and use conditions of the radial needle bearing 30 can be accurately calculated. This ensures that the circularity ΔR of the roller members 30B falls within the minimum oil film thickness $h_{min}$ to avoid excessive quality in terms of the circularity of the roller members 30B while reliably avoiding a high level of noise from the radial needle bearing 30.

Furthermore, the minimum oil film thickness $h_{min}$ is calculated from equation (1) above, i.e., the Dowson-Higginson equation, using the speed parameter U calculated from the lower limit of the normal-use rotational speed range, at which the oil film of the lubricating oil O has the minimum thickness $h_{min}$, of the electric compressor 1 with which the radial needle bearing 30 is used; therefore, if the circularity ΔR of the roller members 30B is set to be lower than or equal to the minimum oil film thickness $h_{min}$, the precision of the circularity of the roller members 30B can be decreased to the minimum required level while reducing the noise from the radial needle bearing 30 alone during rotation over the entire operating rotational speed range of the electric compressor 1.

If the precision of the circularity of the roller members 30B in a cross section perpendicular to the centerline CL thereof decreases in the direction from the center toward the ends of the roller members 30B in the axial direction, the following advantageous effect is provided. Specifically, in general, in the radial needle bearing 30, which includes the curved portions 30D formed at both ends of the roller members 30B in the axial direction mainly to avoid stress concentration near the ends of the contact area between the roller members 30B and the raceway thereof, the roller members 30B are slightly more tilted as the rotating shaft, i.e., the crank shaft 15, rotates at a higher speed, and accordingly, the likelihood of contact is higher near the ends of the curved portions 30D than on the rolling surfaces F of the roller members 30B. At the same time, more lubricating oil is supplied to form a thicker oil film as the crank shaft 15 rotates at a higher speed.

Therefore, even if the precision of the circularity is low near the ends of the curved portions 30D, the thick oil film compensates for the poor circularity so that less noise occurs. Thus, the noise level does not increase even if the precision of the circularity decreases toward the ends of the curved portions 30D, which avoids excessive quality in terms of the circularity of the roller members 30B in a cross section perpendicular to the centerline CL thereof, thus reducing the manufacturing costs of the radial needle bearing 30 and thereby reducing the manufacturing costs of the electric compressor 1 without increasing the noise level of the radial needle bearing 30.

Figure 5A:
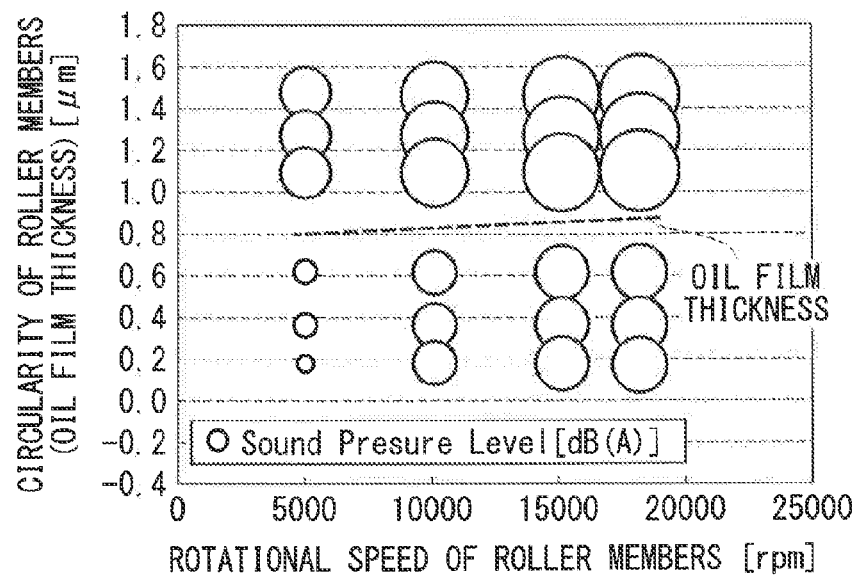
FIG. 5A is a graph showing the correlation between the circularity of roller members in a cross section perpendicular to the centerline thereof, the rotational speed of the roller members, the oil film thickness, and the noise level, showing the noise level of the bearing alone to demonstrate the advantages of the present invention.
Figure 5B:
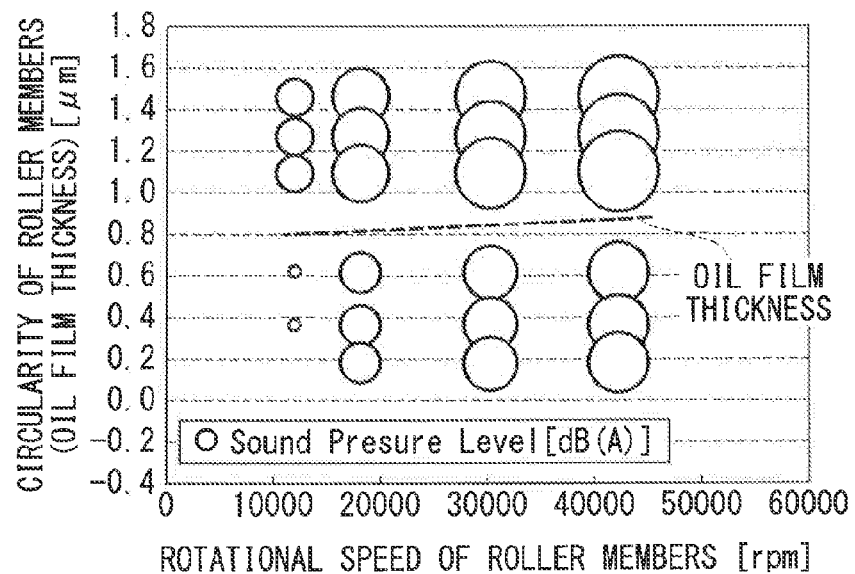
FIG. 5B is a graph showing the correlation between the circularity of roller members in a cross section perpendicular to the centerline thereof, the rotational speed of the roller members, the oil film thickness, and the noise level, showing the noise level of an electric compressor equipped with the bearing to demonstrate the advantages of the present invention.

FIGS. 5A and 5B are graphs showing the correlation between the circularity of the roller members 30B, the rotational speed of the roller members 30B, the oil film thickness, and the noise level, where FIG. 5A shows the noise level of a bearing alone, and FIG. 5B shows the noise level of an electric compressor equipped with the bearing. The diameters of the circles shown in the graphs conceptually indicate the sound level. These results are based on experiments carried out by the inventors. FIGS. 5A and 5B both demonstrate that the oil film thickness increases from 0.8 µm to 0.9 µm with increasing rotational speed of the roller members 30B.

As shown in FIG. 5A, in the experiment on the radial needle bearing 30 alone, when the noise level of the radial needle bearing 30 alone was measured with varying circularities, i.e., 0.18 µm, 0.36 µm, 0.62 µm, 1.10 µm, 1.27 µm, and 1.47 µm, of the roller members 30B in a cross section perpendicular to the centerline thereof in the portions (curved portions 30D) occupying 10% to 30% of the length of the roller members 30B from the end surfaces 30E thereof, the noise level in the case where the circularity of the curved portions 30D was lower than or equal to the thickness of the resulting oil film (0.8 to 0.9 µm) was about 7 dB(A)[AVE] lower than the noise level in the case where the circularity was more than the thickness of the resulting oil film.

On the other hand, as shown in FIG. 5B, when the noise level of an electric compressor was similarly measured using similar radial needle bearings 30 having varying circularities of the crown portions, the noise level of an electric compressor equipped with a bearing whose circularity of the roller members 30B in a cross section perpendicular to the centerline thereof was lower than or equal to the thickness of the resulting oil film (0.8 to 0.9 µm) was about 3.5 dB(A)[AVE] lower than the noise level of an electric compressor equipped with a bearing whose circularity of the roller members 30B was more than the thickness of the resulting oil film.

As described above, in the method for designing a radial roller bearing, the radial roller bearing, and the electric compressor including the radial roller bearing according to the present invention, the circularity of the roller members 30B in a cross section perpendicular to the centerline CL thereof is set to be lower than or equal to the minimum oil film thickness $h_{min}$ of the oil film formed by the lubricating oil; therefore, the properties of the lubricating oil can be utilized to avoid excessive quality in terms of the circularity of the roller members 30B while reducing the noise from the bearing alone during rotation and thereby reducing the noise from an electric compressor for achieving improved quality.

The present invention is not limited to the particular structure of the embodiment described above; modifications and improvements are possible without departing from the scope of the present invention, and embodiments with such modifications and improvements are included in the scope of the present invention. For example, although the above embodiment illustrates a radial needle bearing as an example of a radial roller bearing, the method for designing a radial roller bearing according to the present invention can also be applied to other types of radial roller bearings.

In addition, the radial roller bearing (radial needle bearing) designed by the present invention is not necessarily applied to electric compressors, but can be applied to various other types of rotary machines, and the noise generated from radial roller bearings in such various rotary machines can be effectively reduced.

REFERENCE SIGNS LIST 1 electric compressor (rotary machine)
15 rotating shaft
30 radial needle bearing (radial roller bearing)
30A outer ring member
30B roller member
30C retainer
30D curved portion
30E end surface (end in axial direction)
$h_{min}$ minimum oil film thickness
O lubricating oil
ΔR circularity

The invention claimed is:

1. A radial roller bearing comprising:
an outer ring member;
a plurality of roller members that roll on an inner surface of the outer ring member; and
a retainer,
a lubricating oil being supplied between the outer ring member or a rotating shaft and the roller members,
wherein the circularity of the roller members in a cross section perpendicular to a centerline thereof is set to be lower than or equal to the minimum oil film thickness of an oil film formed by the lubricating oil.

2. The radial roller bearing according to claim 1, wherein the minimum oil film thickness $h_{min}$ is calculated from the following equation:

$$h_{min} = R * 2.65 G^{0.54} * U^{0.7} * W^{-0.13}$$

wherein R is the relative radius of curvature, G is a material parameter of the lubricating oil, U is a speed parameter of the roller members, and W is a load parameter of the roller members.

3. The radial roller bearing according to claim 2, wherein the speed parameter U is calculated from a lower limit of a normal-use rotational speed range of a rotary machine with which the radial roller bearing is used.

4. The radial roller bearing according to claim 1, wherein each of the roller members has an outer surface whose generatrix in an axial direction is curved such that the outer diameter of the roller member decreases slightly in a direction from the center toward an end thereof in the axial direction to avoid stress concentration in a contact area between a portion of the outer surface of the roller member near the end thereof and the inner surface of the outer ring member or an outer surface of the rotating shaft, and the precision of the circularity of the roller members in a cross section perpendicular to the centerline thereof decreases in the direction from the center toward the end thereof in the axial direction.

5. The radial roller bearing according to claim 1, wherein the circularity is set to 0.8 μm or less if the radial roller bearing is used in an electric compressor for a car air conditioner such that the rotational speed of the roller members is 12,000 to 43,000 rpm.

6. A rotary machine comprising the radial roller bearing according to claim 1 as a bearing part.

7. A method for designing a radial roller bearing provided with
an outer ring member,
a plurality of roller members that roll on an inner surface of the outer ring member, and
a retainer,
a lubricating oil being supplied between the outer ring member and the roller members,
the method comprising:
setting the circularity of the roller members in a cross section perpendicular to a centerline thereof to be lower than or equal to the minimum oil film thickness of an oil film formed by the lubricating oil.

8. The method for designing a radial roller bearing according to claim 7, wherein the minimum oil film thickness $h_{min}$ is calculated from the following equation:

$$h_{min} = R * 2.65 G^{0.54} * U^{0.7} * W^{-0.13}$$

wherein R is the relative radius of curvature, G is a material parameter of the lubricating oil, U is a speed parameter of the roller members, and W is a load parameter of the roller members.

9. The method for designing a radial roller bearing according to claim 8, wherein the speed parameter U is calculated from a lower limit of a normal-use rotational speed range of a rotary machine with which the radial roller bearing is used.

10. The method for designing a radial roller bearing according to claim 7, wherein each of the roller members has an outer surface whose generatrix in an axial direction is curved such that the outer diameter of the roller member decreases slightly in a direction from the center toward an end thereof in the axial direction to avoid stress concentration in a contact area between a portion of the outer surface of the roller member near the end thereof and the inner surface of the outer ring member or an outer surface of a rotating shaft, and the precision of the circularity of the roller members in a cross section perpendicular to the centerline thereof decreases in the direction from the center toward the end thereof in the axial direction.

11. The method for designing a radial roller bearing according to claim 7, wherein the circularity is set to 0.8 μm or less if the radial roller bearing is used in an electric compressor for a car air conditioner such that the rotational speed of the roller members is 12,000 to 43,000 rpm.

* * * * *